July 27, 1943.　　W. R. WEEKS　　2,325,452
STRAINER FOR COFFEE MAKERS
Filed March 30, 1940
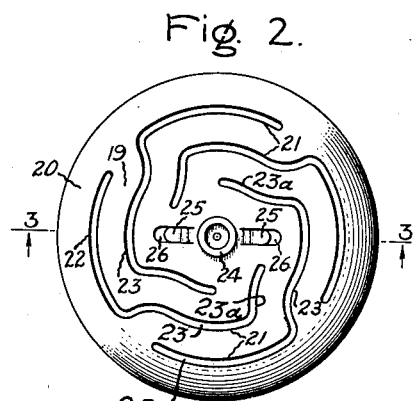
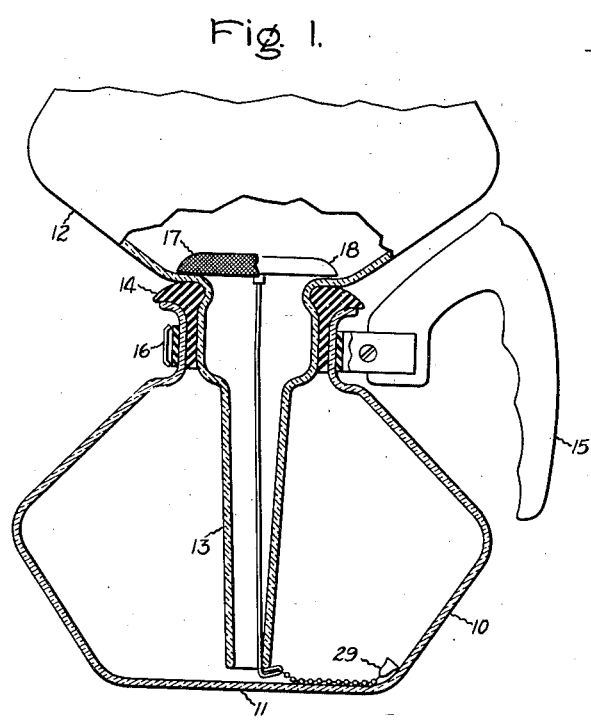
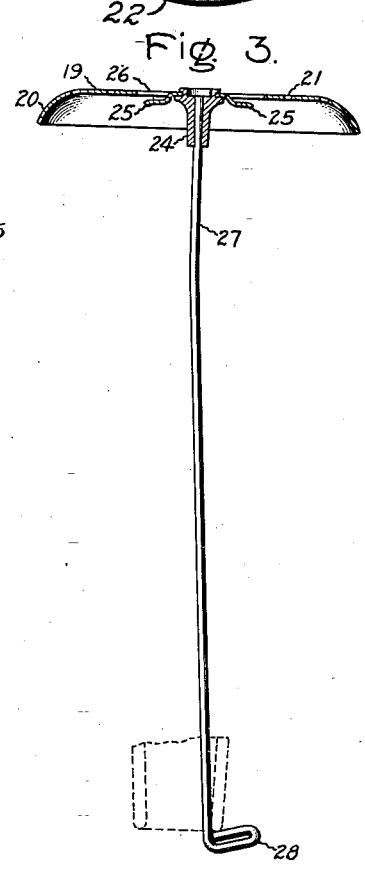
Inventor:
Walter R. Weeks,
by Harry E. Dunham
His Attorney.

Patented July 27, 1943

2,325,452

UNITED STATES PATENT OFFICE 2,325,452

STRAINER FOR COFFEE MAKERS

Walter R. Weeks, Hamden, Conn., assignor to General Electric Company, a corporation of New York Application March 30, 1940, Serial No. 326,944

9 Claims. (Cl. 210—162)

This invention relates to strainers for coffee makers and more particularly to strainers to be used with vacuum type coffee makers in which pressure created in a lower compartment forces heated water up through a stem into an upper compartment in which coffee material is supported on the strainer and subsequent reduction of pressure in the lower compartment causes the brew to be forced through the strainer back into the lower compartment.

It is an object of this invention to provide a new and improved strainer which may be inexpensively manufactured, easily cleaned, and simply and conveniently positioned in and removed from the coffee receptacle.

It is a more specific object of this invention to provide for a coffee maker strainer a new and improved holder which comprises a resilient disk with drain openings positioned therein so as to enhance the resilience of the disk and thereby facilitate its positioning in the coffee receptacle.

Further objects of this invention will become apparent as the following description proceeds and the features of novelty which characterize this invention will be set forth in the claims appended to and forming a part of this specification.

For a more complete understanding of this invention, reference should be had to the accompanying drawing in which Fig. 1 is a fragmentary elevation of a coffee maker, partly in section, showing my improved strainer in position; Fig. 2 is a plan view of the strainer holder of this invention in one form thereof; and Fig. 3 is a section taken on the line 3—3 of Fig. 2 and looking in the direction of the arrows.

Referring to Fig. 1 of the drawing, I have shown my invention in one form thereof applied to the well known vacuum type coffee maker comprising a lower liquid receptacle 10 having a flattened bottom surface 11 adapted to be supported adjacent a suitable source of heat, e. g., an electric hot plate (not shown). Supported on the receptacle 10 is an upper receptacle 12 which is substantially funnel-shaped and is provided with an integrally formed glass stem or spout 13 which is adapted to extend into the lower receptacle and terminate near the bottom thereof. The stem 13 is seated within a rubber gasket or seal 14 which is supported within the neck of the receptacle 10 and is arranged to form an airtight seal between the neck and the stem as is well understood in the art. In order to facilitate pouring of the brew from the lower receptacle, there is provided a suitable handle 15 which is adapted to be clamped to the neck of the lower receptacle by suitable clamping means 16.

The strainer includes a filtering element 17, preferably in the form of a cloth fabric cap, and a holder 18 for the filtering element. In accordance with this invention, the holder 18 comprises a disk of some suitable thin metallic material, preferably thin Monel metal, which is provided with a top surface 19 and a circumferential flange 20 depending from the top surface. Provided in the top surface is a plurality of drain openings 21. In order to increase the resilience of the top surface of the disk, the drain openings are cut in the form of interleaved slots each of which has a curved portion 22 which extends substantially parallel to the outer edge of the disk and an inwardly extending portion 23 which is spaced between the preceding and succeeding slots. It will be observed that the portion 23 is substantially parallel to the outer curved portion 22 of the next succeeding slot, and that it in turn terminates in a portion 23a that extends abruptly inwardly; this portion 23a in turn, as shown, is substantially parallel to the turned-in part 23 of the next succeeding slot. While the configuration of the drain openings shown in Fig. 2 is the preferred in that it has been found to impart the desired resilience to the top surface of the disk, it is to be understood that it is not intended to limit this invention to such a configuration since any other suitable configuratoin may be used which will accomplish the dual purpose of providing suitable drain openings over the entire surface of the disk and increasing the resilience of the disk so that the top surface thereof may be readily flexed in the manner and for the purposes described below.

The disk is mounted at its center on a collar 24 which is provided with a head which is adapted to be peened over to hold the disk securely in position. Provided adjacent the center of the disk on opposite sides of the collar is a pair of pressed out ears 25 to which the draw cord (not shown) of the fabric cap 17 is adapted to be secured. The openings 26 formed by pressing out the ears 25 serve as additional drain openings at the center of the disk. Extending downwardly from the collar is a rod 27 which adjacent its lower end is bent to form a hook 28 which is in the form of a loop to which is secured a suitable pull chain 29, shown in Fig. 1. While the rod 27 is shown as made from a single piece of wire with the hook integrally formed thereon, it is understood that the hook may be separate and connected to the disk by suitable means such as a series of short rods suitably linked together.

In manufacturing the holder, the disk is punched and pressed from sheet material so as to have the desired shape and arrangement of slots. By a separate operation, the rod 27 is formed and the collar 24 secured thereto preferably by cone swaging. The disk is then secured to the collar in the manner described above and the pull chain attached to the loop hook 28.

To assemble the strainer in a coffee maker, the filtering cloth or cap 17 is first placed over the top of the disk of holder 18 and the draw string for the cloth is pulled tight at the edges so that the fabric will be stretched over the sides of the disk. The ends of the draw string will then be wrapped around the ears 25 and are tied. The holder with the filtering cloth attached thereto is next inserted into the upper bowl so that the downwardly extending flange 20 of the disk engages the lowermost portion of the bowl near the throat of the stem 13. In this position the rod 27 extends downwardly through the stem 13 so that the pull chain 29 connected thereto will depend below the end of the stem. The chain is then grasped and pulled downwardly and then laterally so that the hook 28 will engage the lower end of the stem as shown in Fig. 1. It will be observed that the rod 27 is provided with a slight offset so that the hook will readily engage the end of stem 13. Pulling downwardly on the rod 27 causes the disk to be stressed from its normal position and after the hook has been slipped over the end of the stem a force is applied due to the resilience of the disk which tends to hold the strainer in position with the result that the strainer is securely held in place with the disk portion thereof circumferentially seated in the bottom of the upper bowl. Thus, by providing the drain openings in the form of slots constructed and arranged in the manner described above, sufficient resilience is imparted to the disk to facilitate the insertion and removal of the strainer from the coffee maker and at the same time to hold the strainer firmly in position. The strainer may be readily removed by merely unhooking the rod 27 from the lower end of the stem 13 and then drawing the strainer through the upper end of the bowl 12.

It will be seen from the foregoing description that my improved strainer holder is extremely simple in construction and may be readily and simply placed in its appropriate position in a coffee maker of the type described. It will also be observed that the principal element of the holder can be readily and economically fabricated by suitable punch press operations and that the entire assembly may be readily and easily cleaned after use.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A strainer comprising a thin supporting disk having a plurality of drain openings therein in the form of slots at least a portion of which extend in other than a radial direction, said slots acting to increase the resilience of said disk so that it can be flexed to facilitate the insertion and removal of said strainer into and from its operative position and so that when said strainer is in its operative position said disk can be flexed so as to produce a force sufficient to secure said strainer firmly in said operative position, a filtering element supported by and encasing said disk, and a pair of ears pressed out of the central portion of said disk and adapted to receive means for securing said filtering element on said disk, the pressing out of said ears providing additional drain openings in said disk.

2. In a strainer for a vacuum type coffee maker, a resilient holder comprising a metallic disk having a top surface and a depending circumferential flange, said top surface having a plurality of drain openings therein which are in the form of elongated slots, each slot having at least a portion which extends in other than a radial direction, said slots acting to increase the resilience of said surface so that it may be flexed during the insertion and removal of said strainer into and from said coffee maker, a filtering element supported by and encasing said disk, and a fastening device extending downwardly from the central portion of said disk having a hooked portion at the lower end thereof for removably securing said strainer in its operative position in said coffee maker.

3. In a strainer for a vacuum type coffee maker, a resilient holder comprising a metallic disk having a top surface and a depending circumferential flange, said top surface having a plurality of drain openings therein which are in the form of elongated slots having an outer portion substantially parallel to the periphery of said disk and an inwardly extending portion lying between the next preceding and succeeding slots, a filter element supported by and encasing said disk, and a rod extending downwardly from the central portion of said disk having a hooked portion at the lower end thereof for removably securing said strainer in its operative position in said coffee maker.

4. A holder for a filter element of a vacuum type coffee maker comprising a cup-shaped disk having a plurality of drain openings therein in the form of elongated slots spaced in said disk so as to have an outer portion lying substantially parallel to the periphery of said disk and an inwardly extending portion lying between the next preceding and succeeding slots, a collar secured to the center of said disk, fastening means having one end secured to said collar and being provided at its other end with a hooked portion for removably securing said holder in position, and a pair of filtering element fastening ears pressed from said disk near said collar, the pressing out of said ears forming additional drain openings in said disk.

5. A holder for the filter element for a vacuum type coffee maker comprising a cup-shaped disk having a surface provided with a plurality of slots which serve as drain openings, each slot having at least a portion extending in other than a radial direction so as to increase the resilience of said disk, a supporting collar secured to the center of said disk, a rod having one end secured to said collar and having a hooked portion at the opposite end thereof for removably securing said holder in its operative position, and a pair of depending ears pressed out of said disk adjacent the center thereof for securing said filter element in position on said holder, the pressing out of said ears defining additional drain openings at the center of said disk.

6. In a vacuum type coffee maker provided with a funnel-shaped receptacle having a bowl and a stem and with a filter element, a holder for said filter element comprising a cup-shaped disk having a plurality of drain openings therein, said openings being in the form of elongated slots having an outer portion lying substantially parallel to the periphery of said disk and an inwardly extending portion lying between the next preceding and succeeding slots so as to increase the resilience of said disk, fastening means secured to the center of said disk having a hooked portion adapted to engage the lower end of said stem, said fastening means being of such length that when said hooked portion is engaged by said stem said disk is flexed so that said holder is securely held in position in said receptacle.

7. In a vacuum type coffee maker provided with a funnel-shaped receptacle having a bowl and a stem and with a filter element, a disk for holding said filter element having a plurality of drain openings therein, said openings being in the form of elongated slots having an outer portion lying substantially parallel to the periphery of said disk and an inwardly extending portion lying between the next preceding and succeeding slots so as to increase the resiliency of said disk, and fastening means secured to said disk and constructed and arranged to engage said stem so as to flex said disk and hold it securely in position in said receptacle.

8. In a vacuum type coffee maker provided with a funnel-shaped receptacle having a bowl and a stem and with a filter element, a disk for holding said filter element having a plurality of drain openings therein, said openings being in the form of elongated slots having an outer portion lying substantially parallel to the periphery of said disk and an inwardly extending portion lying between the next preceding and succeeding slots so as to increase the resiliency of said disk, and fastening means coacting with said disk and a part of said bowl in order to removably secure said disk in its operative position in said bowl.

9. In a vacuum type coffee maker provided with a funnel-shaped receptacle having a bowl and a stem and with a filter element, a holder for said filter element comprising a cup-shaped disk having a plurality of drain openings therein, said openings being in the form of interleaved elongated slots, each slot having an outer portion substantially parallel to the periphery of said disk, and also an inturned portion that is substantially parallel to the outer portion of the next succeeding slot and further, said inturned portion having an end portion that extends abruptly inwardly so as to be substantially parallel to the inturned portion of the next succeeding slot, and fastening means for attaching the disk to said stem so as to flex said disk.

WALTER R. WEEKS.